Figure 1:
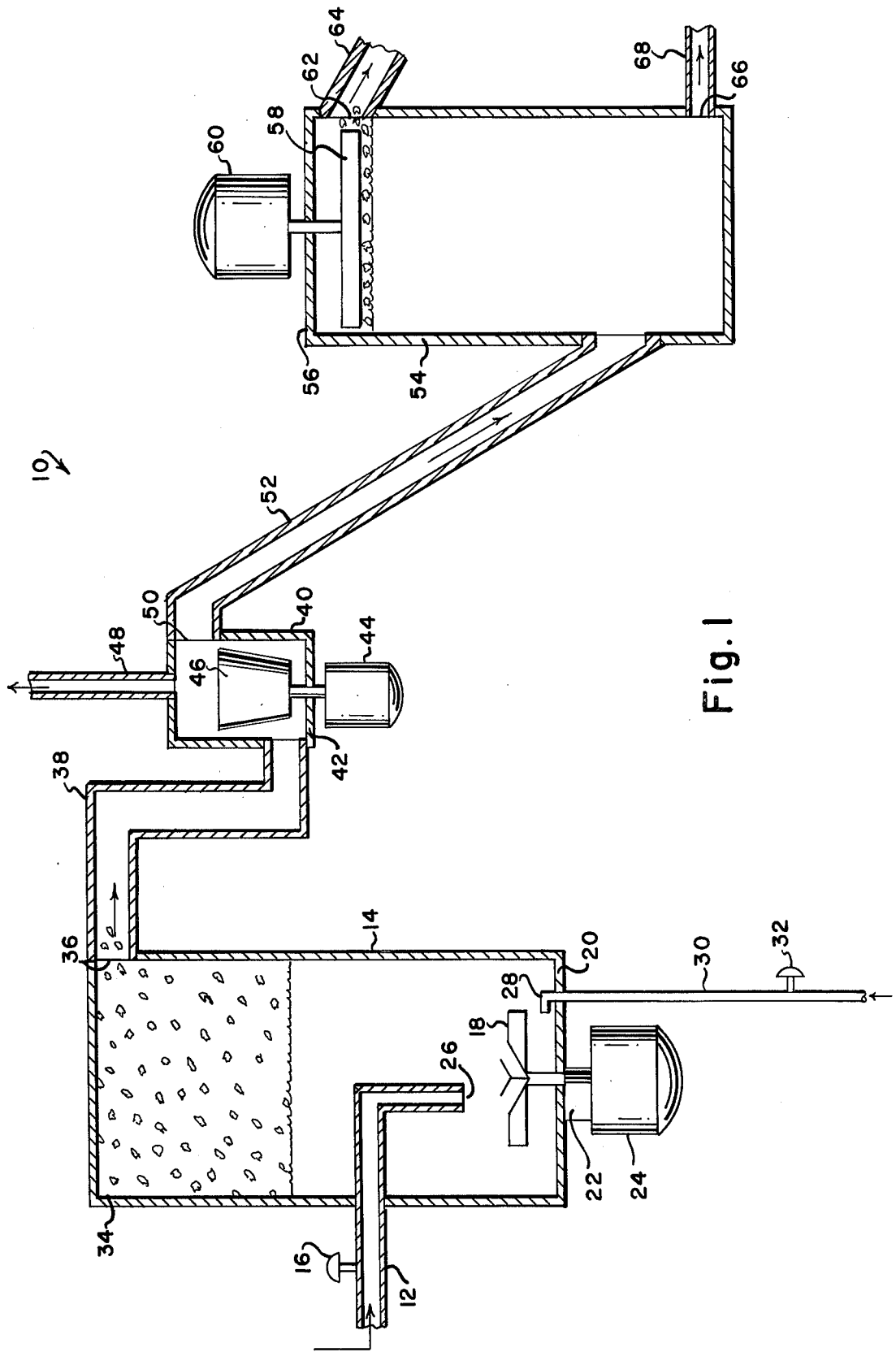

United States Patent [19]

Zucker

[11] 4,088,638

[45] May 9, 1978

[54] METHOD AND APPARATUS FOR RECOVERING SAPONIFIED OIL

[75] Inventor: Jerry Zucker, Lake Como, Fla.

[73] Assignee: Hudson Pulp & Paper Corp., New York, N.Y.

[21] Appl. No.: 711,619

[22] Filed: Aug. 4, 1976

Related U.S. Application Data

[63] Continuation-in-part of Ser. No. 672,836, Apr. 1, 1976.

[51] Int. Cl.$^2$ ............................................... C09F 5/10
[52] U.S. Cl. ................................ 260/97.5; 210/259; 260/97.6; 260/97.7
[58] Field of Search ................ 260/97.5, 97.6, 97.7, 260/91.5

[56] References Cited

U.S. PATENT DOCUMENTS 2,200,468   5/1940   Cirves ................................. 260/97.5
3,449,313   6/1969   Bolger et al. ...................... 260/97.6

*Primary Examiner*—Melvyn I. Marquis
*Attorney, Agent, or Firm*—Pasquale A. Razzano; Harold L. Stults

[57] ABSTRACT

A method and apparatus for continuously removing agglomerable particles from a liquid, such as for example tall oil soap particles from the black liquor formed in a wood pulping process, are disclosed wherein a substantially continuous stream of the liquor is supplied to a first container wherein the liquor is whipped in the presence of air to agglomerate soap particles into particles of substantially larger size. The foam is then removed from the first container, near the top of the container, and supplied in a deaerating apparatus which deaerates the foam and produces a mixture of liquid and agglomerated soap particles. This mixture is then supplied to a skimming tank wherein the soap particles float to the top of the tank and are removed while liquid is drained from the bottom of the container.

7 Claims, 1 Drawing Figure

METHOD AND APPARATUS FOR RECOVERING SAPONIFIED OIL

This application is a continuation-in-part of U.S. patent application Ser. No. 672,836, filed Apr. 1, 1976, the disclosure of which is incorporated herein by reference.

The present invention relates to the recovery of agglomerable particles from a liquid, and more particularly to the recovery of tall oil soap particles from the black liquor produced in wood pulping processes.

In the wood pulping industry tall oil soap in the black liquor obtained from pulp digesters via the pulp washers and/or evaporators is typically recovered by skimming off tall oil soap particles which float on the surface of the liquor as a scum. However, additional or residual tall oil soap remains dispersed in fine particles within the skimmed black liquor and is usually lost when that liquor is burned to recover soda values.

Residual tall oil in skimmed liquor has long been a matter of concern for the pulp industry. A residual of .7% based on black liquor solids has historically been established as an acceptable value. Aside from a smaller dissolved fraction, this residual is a result of minute soap particles which remain suspended in the black liquor. Because of their small size, the rate that these soap particles rise through the liquor is so slow that, under normal retention conditions in skimming tanks, the particles never make it to the top to be skimmed off and are thus lost when the liquor is burned.

In the above identified application, a process is disclosed which permits the recovery of additional tall oil soap values from the black liquor where the liquor is stored in an open pond associated with the pulp mill. By that process black liquor stored in the pond is treated and acted upon in order to produce a layer of soap particles on the surface of the pond which can be skimmed from the pond. In accordance with the present invention the soap particles from the black liquor are agglomerated and removed from the liquor in a continuous process separate from any use of storage ponds.

It is an object of the present invention to remove tall oil soap particles from black liquor in a continuous process.

Another object of the present invention is to remove agglomerable particles from a liquid containing such particles by a continuous and relatively simple process.

A still further object of the present invention is to agglomerate tall oil soap particles in black liquor and remove the agglomerated particles therefrom by a continuously operable and substantially automatic process.

In accordance with an aspect of the present invention, tall oil soap particles, or other agglomerable particles, are removed from a liquor containing such particles by supplying a substantially continuous steam of the liquor to a first container wherein the liquor is whipped in the presence of air to produce a foam. The whipping action agglomerates the soap particles in the liquor, and the resulting foam is removed from the first container and deaerated to produce a liquid mixture of liquor and agglomerated soap particles. This mixture is then directed to a settling tank wherein the agglomerated soap particles float to the top of the liquor and are removed.

The above, and other objects, features and advantages of this invention will be apparent in the following detailed description of an illustrative embodiment thereof, which is to be read in connection with the accompanying single FIGURE of the drawings which schematically illustrates, in side sectional view, an apparatus constructed in accordance with the present invention for carrying out a substantially continuous process of removing tall oil soap particles from black liquor.

As seen in the drawing, an apparatus 10 for removing tall oil soap particles from the black liquor produced from wood pulping processes includes a conduit 12 through which black liquor is continuously supplied to a whipping vat 14. Conduit 12 may be provided with an automatic or manually controlled valve 16 which enables the operator to control the flow rate of liquor into vat 14.

Vat 14 includes a whipping valve 18 rotatably mounted in the lower end 20 of the vat, and operatively coupled through a gear box 22 to a motor (preferably an electric motor) 24. The whipping vane consists of a plurality of blades and may have a configuration similar to that of a propeller which when rotated by motor 24 will agitate the black liquor contained in the vat to form a foam. Preferably the black liquor is supplied through the conduit 12 to a position 26 directly adjacent vane 18 so that all of the liquor entering the vat is contacted by the vane, agitated and whipped into the foam.

Whipping vane 18 is preferably associated with an air injection nozzle 28 connected to an air supply line 30 which in turn is connected through a pressure regulator 32 to a source of air under pressure. As illustrated, air injection nozzle 28 is positioned adjacent vane 18 so that during the whipping operation the air is entrapped in the black liquor.

The beating or whipping action on the black liquor and the soap particles therein causes the soap to agglomerate, thus forming relatively large globules or particles of the soap. The supply of air to the whipping vanes, against the violent whipping action thereof, produces small bubbles which tend to adhere to the soap particles, and facilitate their agglomeration into substantially larger soap particles In addition the creation of the air bubbles in this manner produces an aerated foam which rises towards the top 34 of vat 14.

Vat 14 includes an outlet opening 36 adjacent its upper end through which foam produced by the whipping process is continuously discharged. Since the black liquor is continuously supplied to the vat and the whipping operation is continuous, the rising foam will flow automatically out of discharge opening 36. A conduit 38 is operatively connected in communication with opening 36, in any convenient manner, to guide the foam from the vat to a deaerating device 40. In the deaerating device the air entrapped in the whipped foam is removed, thereby to produce a liquor or liquid mixture containing the black liquor and the agglomerated soap particles immersed therein.

In the illustrative embodiment of the invention deaerating device 40 comprises a bucket type centrifuge of conventional construction. This centrifuge includes a housing 42 connected by conduit 38 in fluid flow communication with vat 14, as well as an electric motor 44 and a bucket type centrifuge element 46 within the housing 42. The latter is located such that foam from vat 14 will flow by gravity into housing 42 where it is acted upon by the rapidly rotating bucket shaped element 46 so that the bubbles of foam are subjected to centrifugal force removing air from the suspension. The air separated from the foam is permitted to escape through a stand pipe 48, connected to the top of housing 42, to the atmosphere.

As a result of the deaeration of the foam, a liquid containing agglomerated soap particles remains and is discharged from housing 42 through an upper opening 50 formed therein. This opening is connected by a conduit 52 to a skimming or settling tank 54. It is noted that housing 42 is located with its bottom end portion at or about the level of the top end 56 of housing 54 so that liquid produced from the foam in deaerator 40 will flow by gravity to tank 54. In tank 54 the agglomerated soap particles will float to the top of the liquor in the tank, and any air remaining entrapped in the soap particles will aid in the buoyancy of the soap particles.

The resulting layer of soap particles or scum on the top of the liquid in tank 54 is removed from the tank by a skimming blade 58 rotatably mounted in tank 54 and driven by an electric motor 60 or the like. Rotation of the blade 58 pushes the scum or layer of soap particles through a discharge opening 62 in the top end of the tank to a discharge chute 64 from which the soap particles are collected. The liquor in the tank on the other hand is discharged through the lower end of the tank through a discharge opening 66 to a conduit 68. This conduit may lead to the facilities of the pulp mill which utilize and burn the black liquor, or to a storage pond or the like.

As the soap particles in the black liquor are agglomerated into relatively large particles by the whipping and deaerating process, once the liquor enters the skimming tank 54, the particles will rise relatively rapidly to the top surface of the liquor. Thus the process according to the present invention can be performed continuously, with a continuous production of soap particles flowing from the discharge chute 64 and a continuous supply of liquor, depleted in soap particles, being discharged through conduit 68.

From the above it is seen that a relatively simply constructed apparatus is provided for performing a substantially continuous tall oil soap removal process. The process can be performed directly on black liquor as it leaves the pulp making process, without the need for first storing the liquor in a storage pond or skimming tank. The whipping action on the liquor produces a substantial agglomeration of the soap particles in the liquor, and results in a greater recovery of tall oil soap values than in previously proposed systems.

While the illustrative embodiment of the invention has been described particularly with reference to the recovery of tall oil soap values from the black liquor produced in pulping processes, it is contemplated that the process of the present invention can be used to recover agglomerable solid particles from other types of liquids containing such particles.

Although an illustrative embodiment of the present invention has been described herein with reference to the accompanying drawing, it is to be understood that the invention is not limited to that precise embodiment thereof but that various changes and modifications may be effected therein by one skilled in the art without departing from the scope or spirit of this invention.

What is claimed is:

1. A process for removing tall oil soap particles from the black liquor formed in a wood pulping process which comprises the steps of, continuously supplying a stream of black liquor to a first container; producing an aerated foam in said container by whipping the black liquor in said first container in the presence of air to agglomerate soap particles in the black liquor into soap particles of substantially larger size and to foam the black liquor; removing only aerated foam from said first container near the top of the first container; deaerating said foam removed from said first container to produce a mixture of liquid and buoyant agglomerated soap particles; directing said liquid and soap particles to a second container wherein the soap particles are permitted to float to the top of said second container and thereafter skimming soap particles from the top of said second container while draining liquid from the bottom of the second container.

2. The process as defined in claim 1 wherein said whipping steps includes the steps of directing said black liquor in the blades of a rotary whipping device, directing a supply of air into said blades and rotating said blades to whip the black liquor and air together to produce said foam.

3. The process as defined in claim 2 wherein said deaerating step comprises the step of passing said foam through a bucket type centrifuge.

4. A process for removing tall oil soap particles from the black liquor formed in wood pulping processes which comprises the steps of supplying a steam of black liquor to a first container, producing a foam from said black liquor in said first container, removing foam from the first container and deaerating the foam to produce a liquid mixture of liquor and agglomerated soap particles; and supplying said liquid mixture to a settling tank wherein the agglomerated soap particles float to the top of the liquor and are removed.

5. The process as defined in claim 4 wherein said foaming step comprises the step of whipping black liquor at the bottom of said first container while simultaneously introducing air into the black liquor.

6. The process as defined in claim 5 wherein said deaerating step comprises the step of passing said foam from said first container through a centrifuge device.

7. A process for removing agglomerable particles from a liquid in which such particles are suspended; said process comprising the steps of supplying a stream of said liquid containing said agglomerable particles to a first container, agglomerating said particles by whipping said liquid in the presence of air to produce a foam; removing the foam from the first container and deaerating the foam to produce a liquid containing said agglomerated particles, and then placing said deaerated liquid in a second container wherein the agglomerated particles float to the surface of the liquid for removal therefrom.

* * * * *